(12) United States Patent
Mori

(10) Patent No.: US 12,488,585 B2
(45) Date of Patent: Dec. 2, 2025

(54) METHOD FOR DETECTING PATTERN IMAGE, INFORMATION PROCESSING APPARATUS, AND DETECTION SYSTEM

(71) Applicant: SEIKO EPSON CORPORATION, Tokyo (JP)

(72) Inventor: Yuki Mori, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 307 days.

(21) Appl. No.: 18/361,246

(22) Filed: Jul. 28, 2023

(65) Prior Publication Data
US 2024/0037934 A1 Feb. 1, 2024

(30) Foreign Application Priority Data
Jul. 29, 2022 (JP) ................................. 2022-122157

(51) Int. Cl.
| | |
|---|---|
| G06V 10/98 | (2022.01) |
| G06T 5/70 | (2024.01) |
| G06T 5/92 | (2024.01) |
| G06T 7/90 | (2017.01) |
| G06V 20/50 | (2022.01) |

(52) U.S. Cl.
CPC ............. G06V 10/993 (2022.01); G06T 5/70 (2024.01); G06T 5/92 (2024.01); G06T 7/90 (2017.01); G06V 20/50 (2022.01); G06T 2207/10024 (2013.01)

(58) Field of Classification Search
CPC .... G06V 10/993; G06V 20/50; G06V 10/245; G06T 5/70; G06T 5/92; G06T 7/90; G06T 2207/10024
See application file for complete search history.

(56) References Cited

U.S. PATENT DOCUMENTS

| | | | |
|---|---|---|---|
| 2009/0002510 A1 | 1/2009 | Uchihashi et al. | |
| 2016/0295184 A1 | 10/2016 | Ishikawa et al. | |
| 2019/0005607 A1* | 1/2019 | Tamai | G03B 21/14 |
| 2019/0073753 A1* | 3/2019 | Yamauchi | G06T 7/73 |
| 2020/0329221 A1* | 10/2020 | Chien | H04N 9/3185 |

FOREIGN PATENT DOCUMENTS

| | | | |
|---|---|---|---|
| JP | 2009-010782 A | | 1/2009 |
| JP | 2013-098712 A | | 5/2013 |
| JP | 2016-192710 A | | 11/2016 |
| JP | 2021-158393 A | | 10/2021 |

* cited by examiner

*Primary Examiner* — Abhishek Sarma
(74) *Attorney, Agent, or Firm* — Dority & Manning, P.A.

(57) ABSTRACT

A method for detecting a pattern image includes causing a projector to display a first pattern image, acquiring a first captured image that is an image, captured with a camera, of the first pattern image, performing detection of a second pattern image corresponding to the first pattern image from the first captured image, when the detection of the second pattern image from the first captured image fails, performing first correction that increases possibility of successful detection of the second pattern image on the first captured image to acquire a second captured image, and performs detection of the second pattern image from the second captured image.

10 Claims, 6 Drawing Sheets

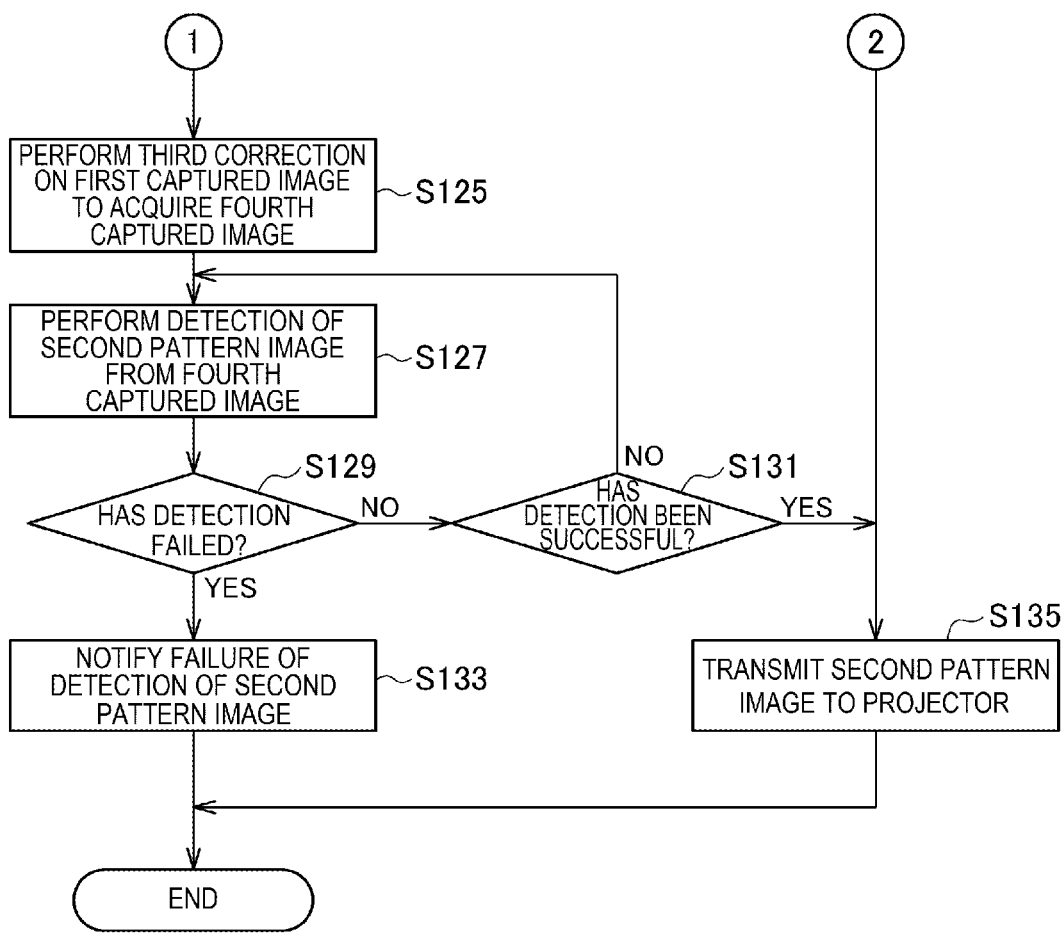

METHOD FOR DETECTING PATTERN IMAGE, INFORMATION PROCESSING APPARATUS, AND DETECTION SYSTEM

The present application is based on, and claims priority from JP Application Serial Number 2022-122157, filed Jul. 29, 2022, the disclosure of which is hereby incorporated by reference herein in its entirety.

BACKGROUND

1. Technical Field

The present disclosure relates to a method for detecting a pattern image, an information processing apparatus, a detection system, and a non-transitory computer-readable storage medium storing a program.

2. Related Art

A variety of technologies for performing calibration on a projector have been disclosed before.

For example, JP-A-2016-192710 describes that the processes below are carried out to perform calibration on a projector. First, reference points that characterize the four corners of a screen are detected from an image captured with a camera. Thereafter, when there is a reference point where detection thereof has failed out of the four corners of the screen, a reference point automatically detected in the previous calibration is used.

In the technology described in JP-A-2016-192710, when a pattern image containing the reference points cannot be detected from the captured image, the result of the previous detection is used. In this case, when the positions of the reference points contained in the pattern image in the currently captured image are separate from the positions of the reference points contained in the pattern image in the previously captured image, the accuracy of the detection of the positions of the reference points may be low. In other words, it is preferable to detect the pattern image from the currently captured image.

SUMMARY

A method for detecting a pattern image according to an aspect of the present disclosure includes causing a display apparatus to display a first pattern image, acquiring a first captured image that is an image, captured with a camera, of the first pattern image, performing detection of a second pattern image corresponding to the first pattern image from the first captured image, when the detection of the second pattern image from the first captured image fails, performing first correction that increases possibility of successful detection of the second pattern image on the first captured image to acquire a second captured image, and performing detection of the second pattern image from the second captured image.

An image processing apparatus according to another aspect of the present disclosure causes a display apparatus to display a first pattern image, acquires a first captured image that is an image, captured with a camera, of the first pattern image, performs detection of a second pattern image corresponding to the first pattern image from the first captured image, when the detection of the second pattern image from the first captured image fails, performs first correction that increases possibility of successful detection of the second pattern image on the first captured image to acquire a second captured image, and performs detection of the second pattern image from the second captured image.

A detection system according to another aspect of the present disclosure includes a display apparatus, a camera, and an information processing apparatus, and the information processing apparatus causes the display apparatus to display a first pattern image, acquires a first captured image that is an image, captured with the camera, of the first pattern image, performs detection of a second pattern image corresponding to the first pattern image from the first captured image, when the detection of the second pattern image from the first captured image fails, performs first correction that increases possibility of successful detection of the second pattern image on the first captured image to acquire a second captured image, and performs detection of the second pattern image from the second captured image.

A non-transitory computer-readable storage medium storing a program according to another aspect of the present disclosure causes a computer to cause a display apparatus to display a first pattern image, acquire a first captured image that is an image, captured with a camera, of the first pattern image, perform detection of a second pattern image corresponding to the first pattern image from the first captured image, when the detection of the second pattern image from the first captured image fails, perform first correction that increases possibility of successful detection of the second pattern image on the first captured image to acquire a second captured image, and perform detection of the second pattern image from the second captured image.

BRIEF DESCRIPTION OF THE DRAWINGS

FIG. 6 is a flowchart showing an example of the processes carried out by the smartphone.

DESCRIPTION OF EXEMPLARY EMBODIMENTS

An embodiment will be described below with reference to the drawings.

1. Configuration of Detection System

Figure 1:
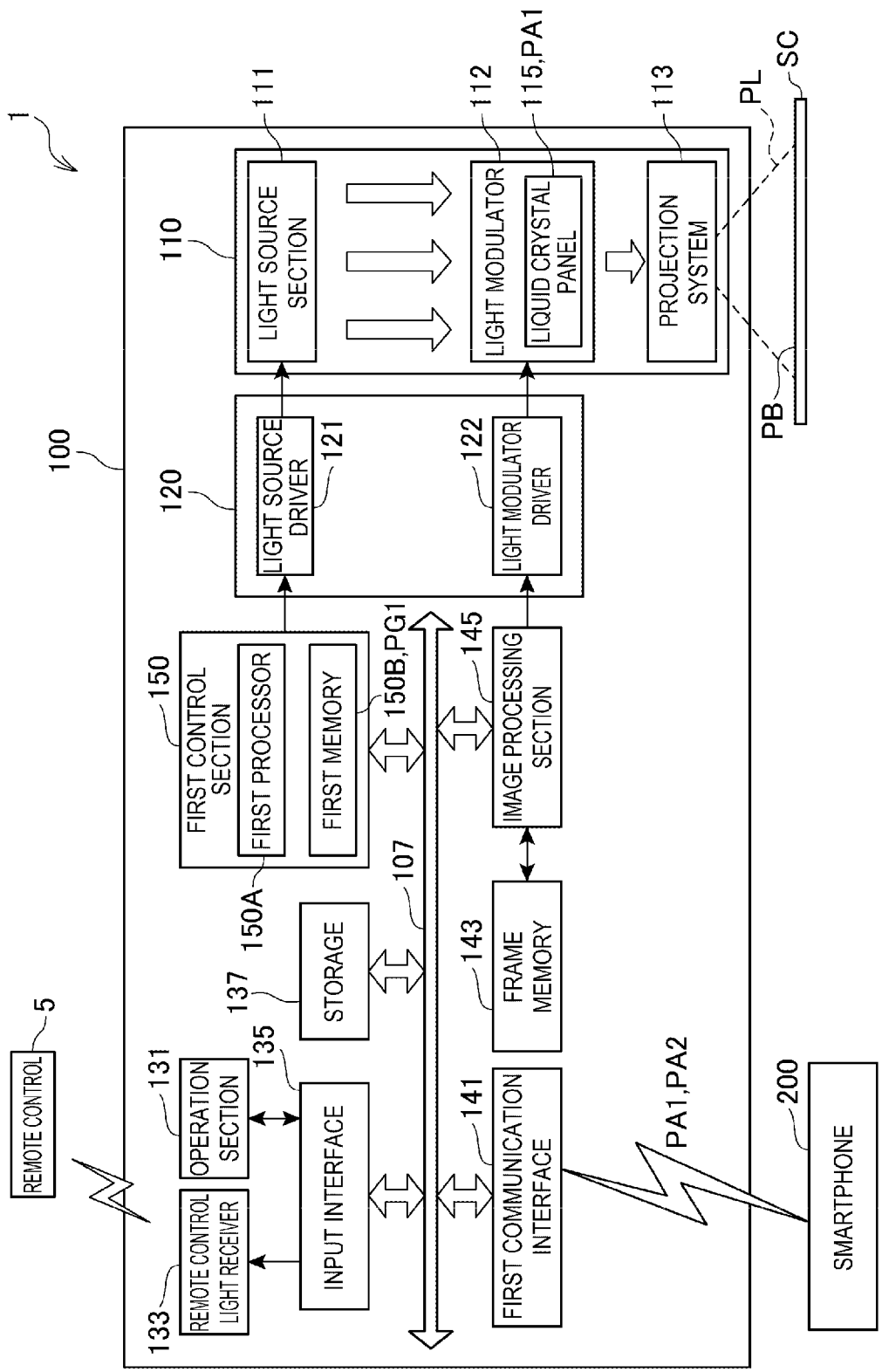
FIG. 1 shows an example of the configuration of a detection system according to an embodiment of the present disclosure.

The configuration of a detection system 1 will first be described with reference to FIG. 1. FIG. 1 shows an example of the configuration of the detection system 1. The detection system 1 includes a projector 100 and a smartphone 200, as shown in FIG. 1.

The projector 100 is communicably connected to the smartphone 200. For example, the projector 100 is connected to the smartphone 200 in a wirelessly communicable manner in compliance with the Wi-Fi (registered trademark) standard.

The projector 100 receives, for example, a first pattern image PA1 from the smartphone 200. The projector 100 then projects the first pattern image PA1 onto a projection surface SC to display a projected image PB.

The smartphone 200 captures an image of the projected image PB with a camera 220 and generates a first captured image PC1. The smartphone 200 detects a second pattern image PA2 corresponding to the first pattern image PA1 from the first captured image PC1. The smartphone 200 then transmits the second pattern image PA2 to the projector 100.

The projector 100 compares the first pattern image PA1 with the second pattern image PA2 to perform what is called "correspondence point detection".

The "correspondence point detection" is detection of the correspondence between the pixels that constitute an image projected by the projector 100 and the pixels that constitute the image captured with the smartphone 200.

The first pattern image PA1 will be further described with reference to FIGS. 3 and 4.

The first captured image PC1 and the second pattern image PA2 will be further described with reference to FIG. 2.

The projector 100 corresponds to an example of a "display apparatus".

The smartphone 200 corresponds to an example of an "information processing apparatus".

The present embodiment will be described with reference to, but not limited to, the case where the projector 100 is connected to the smartphone 200 in a wirelessly communicable manner in compliance with the Wi-Fi (registered trademark) standard. The projector 100 may instead be connected to the smartphone 200 in a wirelessly communicable manner in compliance, for example, with the Bluetooth (registered trademark) standard. Still instead, the projector 100 may be connected to the smartphone 200 via a cable for wired communication. The projector 100 may be connected to the smartphone 200, for example, via a USB (universal serial bus) cable for wired communication.

2. Configuration of Projector

The configuration of the projector 100 will next be described with reference to FIG. 1.

The projector 100 includes a projection section 110 and a driver 120, which drives the projection section 110, as shown in FIG. 1. The projection section 110 is an optical apparatus that forms an optical image and projects the image on the projection surface SC.

The projection section 110 includes a light source section 111, a light modulator 112, and a projection system 113. The driver 120 includes a light source driver 121 and a light modulator driver 122.

The light source section 111 includes a lamp, such as a halogen lamp, a xenon lamp, and an ultrahigh-pressure mercury lamp, or a solid-state light source, such as an LED (light emitting diode) and a laser light source.

The light source section 111 may include a reflector and an auxiliary reflector that guide the light emitted from the light source to the light modulator 112. The light source section 111 may further include, for example, the following optical elements for enhancing the optical characteristics of the projection light: a lens group; a polarizer; or a light adjusting element that is disposed in the path to the light modulator 112 and attenuates the amount of light emitted by the light source.

The light source driver 121 is coupled to an internal bus 107 and turns on and off the light source of the light source section 111 in accordance with an instruction from a first control section 150 also coupled to the internal bus 107.

The light modulator 112 includes, for example, three liquid crystal panels 115 corresponding to the three primary colors, R, G, and B. The characters R, G, and B represent red, green, and blue, respectively. That is, the light modulator 112 includes a liquid crystal panel 115 corresponding to the R light, a liquid crystal panel 115 corresponding to the G light, and a liquid crystal panel 115 corresponding to the B light.

The light outputted by the light source section 111 is separated into three color luminous fluxes of the R light, the G light, and the B light, which enter the liquid crystal panels 115 corresponding thereto. The three liquid crystal panels 115 are each a transmissive liquid crystal panel and each modulate the light passing therethrough to generate image light PL. The image light PL having passed through each of the liquid crystal panels 115 and having therefore been modulated is combined with the others by a light combining system, such as a cross dichroic prism, and the combined image light PL exits toward the projection system 113. The liquid crystal panels 115 may each instead, for example, be a reflective liquid crystal panel or a digital mirror device (DMD).

The light modulator 112 is driven by the light modulator driver 122. The light modulator driver 122 is connected to an image processing section 145.

Image data corresponding to the RGB primary colors are inputted from the image processing section 145 to the light modulator driver 122. The light modulator driver 122 converts the inputted image data into data signals suitable for the action of the liquid crystal panels 115. The light modulator driver 122 applies voltage to each pixel of each of the liquid crystal panels 115 based on the data signals as a result of the conversion to draw an image corresponding to the projected image PB in the liquid crystal panel 115. In the present embodiment, the light modulator driver 122 draws the first pattern image PA1 in each of the liquid crystal panels 115.

The projection system 113 includes a lens, a mirror, and other components that bring the incident image light PL into focus on the projection surface SC. The projection system 113 may further include, for example, a zoom mechanism that enlarges or reduces an image to be projected onto the projection surface SC and a focus adjustment mechanism that performs focus adjustment.

The projector 100 further includes an operation section 131, a remote control light receiver 133, an input interface 135, a storage 137, a first communication interface 141, a frame memory 143, the image processing section 145, and the first control section 150. The input interface 135, the storage 137, the first communication interface 141, the image processing section 145, and the first control section 150 are connected to each other via the internal bus 107 in a data communicable manner.

The operation section 131 includes a variety of buttons or switches provided at the surface of an enclosure of the projector 100, generates an operation signal corresponding to operation performed on any of the buttons or switches, and outputs the generated operation signal to the input interface 135. The input interface 135 outputs the operation signal inputted from the operation section 131 to the first control section 150.

The remote control light receiver 133 receives an infrared signal transmitted from a remote control 5 and decodes the received infrared signal to generate an operation signal. The remote control light receiver 133 includes, for example, a light receiving device that receives the infrared signal. The remote control light receiver 133 outputs the generated operation signal to the input interface 135. The input interface 135 outputs the operation signal inputted from the remote control light receiver 133 to the first control section 150.

The storage 137 is a nonvolatile storage apparatus, such as an HDD (hard disk drive) and an SSD (solid state drive). The storage 137 stores, for example, a program executed by the first control section 150, data processed by the first control section 150, and image data.

The first communication interface 141 includes a connector and an interface circuit and is communicably connected to the smartphone 200. In the present embodiment, the first communication interface 141 is an interface for communication with the smartphone 200 in compliance, for example, with the Wi-Fi (registered trademark) standard. The first communication interface 141 receives the second pattern image PA2 from the smartphone 200.

The first control section 150 includes a first processor 150A and a first memory 150B.

The first memory 150B is a storage apparatus that stores in a nonvolatile manner a program executed by the first processor 150A and data processed by the first processor 150A. The first memory 150B is formed of a magnetic storage apparatus, a semiconductor storage device such as a flash ROM (read only memory), or any other type of nonvolatile storage apparatus. The first memory 150B may include a RAM (random access memory) that constitutes a work area used by the first processor 150A. The first memory 150B may further include an HDD, an SSD, or any other nonvolatile storage apparatus.

The first memory 150B stores data processed by the first control section 150 and a first control program PG1 executed by the first processor 150A.

The first processor 150A may be formed of a single processor, or a plurality of processors may function as the first processor 150A. The first processor 150A executes the first control program PG1 to control each portion of the projector 100. For example, the first processor 150A outputs an instruction of execution of image processing corresponding to operation accepted by the operation section 131 or the remote control 5 and parameters used in the image processing to the image processing section 145. The parameters include, for example, a geometric correction parameter for correction of geometric distortion of the projected image PB to be projected onto the projection surface SC. The first processor 150A further controls the light source driver 121 to turn on and off the light source section 111.

The driver 120, the image processing section 145, and the first control section 150 can each be formed, for example, of an integrated circuit. The integrated circuit includes an LSI, an ASIC (application specific integrated circuit), and a PLD (programmable logic device). The PLD includes, for example, an FPGA (field-programmable gate array). An analog circuit may form part of the configuration of the integrated circuit, or the combination of a processor and an integrated circuit may be used. The combination of a processor and an integrated circuit is called, for example, a microcontroller (MCU), a SoC (System-on-a-chip), a system LSI, and a chipset.

The image processing section 145 develops in the frame memory 143 the image data stored in the first memory 150B or the storage 137. The frame memory 143 includes a plurality of banks. The banks each have storage capacity that allows image data corresponding to one frame to be written to the bank. The frame memory 143 is formed, for example, of an SDRAM (synchronous dynamic random access memory).

The image processing section 145 performs image processing, for example, resolution conversion or resizing, distortion correction, shape correction, digital zooming, and image color tone and brightness adjustment, on the image data developed in the frame memory 143 in accordance with an instruction from the first control section 150.

The first processor 150A of the first control section 150 carries out, for example, the processes below by executing the first control program PG1.

The first processor 150A causes the first communication interface 141 to receive the first pattern image PA1 from the smartphone 200. The first processor 150A then causes the liquid crystal panels 115 to display the first pattern image PA1 via the light modulator driver 122. Furthermore, the first processor 150A causes the projection section 110, via the driver 120, to project the image light PL representing the first pattern image PA1 onto the projection surface SC.

The projector 100 thus displays the projected image PB corresponding to the first pattern image PA1 on the projection surface SC.

The first processor 150A causes the first communication interface 141 to receive the second pattern image PA2 from the smartphone 200. The first processor 150A then compares the first pattern image PA1 with the second pattern image PA2 to perform what is called "correspondence point detection".

3. Configuration of Smartphone

The configuration of the smartphone 200 will next be described with reference to FIG. 2. FIG. 2 shows an example of the configuration of the smartphone 200 according to the present embodiment.

Figure 2:
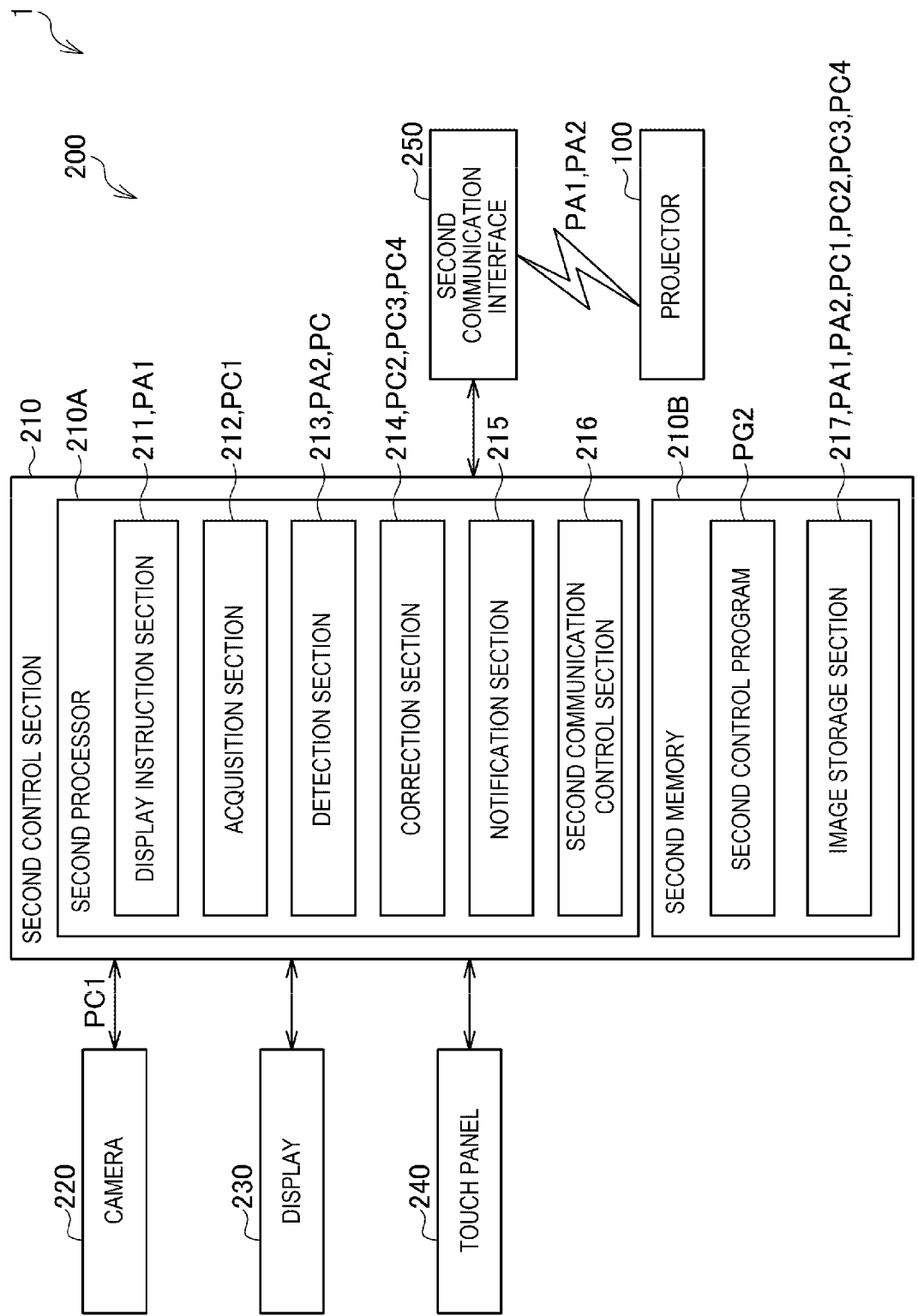
FIG. 2 shows an example of the configuration of a smartphone according to the embodiment.

The smartphone 200 includes a second control section 210, the camera 220, a display 230, a touch panel 240, and a second communication interface 250, as shown in FIG. 2.

The second control section 210 includes a second processor 210A and a second memory 210B.

The second memory 210B is a storage apparatus that stores a program executed by the second processor 210A and data processed by the second processor 210A in a nonvolatile manner. The second memory 210B is formed of a magnetic storage apparatus, a semiconductor storage device, such as a flash ROM, or any other nonvolatile storage apparatus. The second memory 210B may include a RAM that constitutes a work area used by the second processor 210A. The second memory 210B may also include an SSD or any other nonvolatile storage apparatus.

The second memory 210B stores data processed by the second control section 210 and a second control program PG2 executed by the second processor 210A.

The second processor 210A may be formed of a single processor, or a plurality of processors may function as the second processor 210A. The second processor 210A executes the second control program PG2 to control each portion of the smartphone 200.

The camera 220 includes an image sensor, such as a CCD (charge coupled device), a CMOS (complementary metal oxide semiconductor) device, and captures an image of the projected image PB to generate the first captured image PC1. The camera 220 has an autofocus function.

A user positions the smartphone 200 in such a way that the entire projected image PB falls within the imaging region of the camera 220 and causes the camera 220 to generate the first captured image PC1.

The display 230 includes a liquid crystal display (LCD) or any other device and displays a variety of images on the LCD in accordance with instructions from the second control section 210.

The touch panel 240 includes a touch sensor and accepts the user's operation. The touch panel 240 generates an operation signal corresponding to the accepted operation and outputs the generated operation signal to the second control section 210. The touch panel 240 is formed integrally with the LCD display surface of the display 230.

The second communication interface 250 includes a connector and an interface circuit and is communicably connected to the projector 100. In the present embodiment, the second communication interface 250 is an interface for communication with the projector 100 in compliance, for example, with the Wi-Fi (registered trademark) standard. The second communication interface 250 transmits the first pattern image PA1 and the second pattern image PA2 to the projector 100 in accordance with an instruction from the second control section 210.

The second control section 210 includes a display instruction section 211, an acquisition section 212, a detection section 213, a correction section 214, a notification section 215, a second communication control section 216, and an image storage section 217, as shown in FIG. 2. Specifically, the second processor 210A of the second control section 210 executes the second control program PG2 stored in the second memory 210B to function as the display instruction section 211, the acquisition section 212, the detection section 213, the correction section 214, the notification section 215, and the second communication control section 216. Furthermore, the second processor 210A of the second control section 210 executes the second control program PG2 stored in the second memory 210B to cause the second memory 210B to function as the image storage section 217.

The second processor 210A corresponds to an example of a "computer".

The second control program PG2 corresponds to an example of a "program".

The image storage section 217 stores the first pattern image PA1 in advance. The first pattern image PA1 is read from the image storage section 217 by the display instruction section 211.

The display instruction section 211 causes the projector 100 to display the first pattern image PA1. The display instruction section 211 carries out, for example, the processes below. The display instruction section 211 first reads the first pattern image PA1 from the image storage section 217. The display instruction section 211 then transmits the first pattern image PA1 to the projector 100. The display instruction section 211 causes the projector 100 to display the first pattern image PA1 as the projected image PB on the projection surface SC.

The acquisition section 212 acquires the first captured image PC1, which is an image, captured with the camera 220, of the first pattern image PA1 displayed on the projection surface SC, that is, the projected image PB. The acquisition section 212 carries out, for example, the processes below. The acquisition section 212 first instructs the user to position the smartphone 200 in such a way that the entire projected image PB falls within the imaging region of the camera 220. The acquisition section 212 causes the display 230 to display, for example, an instruction image that indicates positioning of the smartphone 200 in such a way that the entire projected image PB falls within the imaging region of the camera 220. After the smartphone 200 is so positioned that the entire projected image PB falls within the imaging region of the camera 220, the acquisition section 212 causes the camera 220 to focus on the projected image PB and capture an image of the projected image PB. The camera 220 captures an image of the projected image PB and generates the first captured image PC1. The acquisition section 212 acquires the generated first captured image PC1.

The detection section 213 performs detection of the second pattern image PA2 corresponding to the first pattern image PA1 from the first captured image PC1. The first captured image PC1 contains the first pattern image PA1 displayed on the projection surface SC. The detection section 213 performs detection of the second pattern image PA2 corresponding to the first pattern image PA1 from the first captured image PC1 containing the first pattern image PA1 displayed on the projection surface SC.

The detection section 213 evaluates whether the detection of the second pattern image PA2 has been successful. When the detection section 213 has successfully detected the second pattern image PA2, the detection section 213 determines that the detection of the second pattern image PA2 has been successful. When the detection section 213 has unsuccessfully detected the second pattern image PA2, the detection section 213 determines that the detection of the second pattern image PA2 has failed.

In the present embodiment, the first pattern image PA1 is, for example, a dot pattern image PD. The first pattern image PA1 may instead, for example, be a checker pattern image PF.

The dot pattern image PD will be further described with reference to FIG. 3.

The checker pattern image PF will be further described with reference to FIG. 4.

When the first pattern image PA1 is the dot pattern image PD, and the conditions below are satisfied, the detection section 213 determines that the detection of the second pattern image PA2 has been successful. That is, when at least 90% of point images PP contained in the dot pattern image PD can be detected, the detection section 213 determines that the detection of the second pattern image PA2 has been successful. In the present embodiment, the number of point images PP is, for example, 1089.

The point images PP will be further described with reference to FIG. 3.

When the first pattern image PA1 is the checker pattern image PF, and the conditions below are satisfied, the detection section 213 determines that the detection of the second pattern image PA2 has been successful. That is, when all first rectangular images PF1 and second rectangular images PF2 contained in the checker pattern image PF of the second pattern image PA2 can be detected, the detection section 213 determines that the detection of the second pattern image PA2 has been successful. In the present embodiment, the number of first rectangular images PF1 and second rectangular images PF2 is 144.

The first rectangular images PF1 and the second rectangular images PF2 will be further described with reference to FIG. 4.

When the detection of the second pattern image PA2 from the first captured image PC1 fails, the correction section 214 performs first correction CP1, which increases the possibility of the successful detection of the second pattern image PA2, on the first captured image PC1 to acquire a second captured image PC2. The detection section 213 performs detection of the second pattern image PA2 corresponding to the first pattern image PA1 from the second captured image PC2.

When the first pattern image PA1 is the dot pattern image PD, the correction section 214 performs the reduction of noise contained in the first captured image PC1 as the first correction CP1. The correction section 214 performs, for example, averaging using an averaging filter as the first correction CP1.

The present embodiment will be described with reference to, but not limited to, the case where the first pattern image PA1 is the dot pattern image PD and the first correction CP1 is the averaging using an averaging filter. The first correction CP1 may instead, for example, be high-frequency reduction using a low pass filter (LPF).

When the first pattern image PA1 is the checker pattern image PF, the correction section 214 performs contrast adjustment as the first correction CP1. The correction section 214 performs, for example, contrast enhancement on the first captured image PC1 as the first correction CP1.

When the first pattern image PA1 is the checker pattern image PF, the description will be made with reference to, but not limited to, the case where the first correction CP1 is the contrast adjustment. The correction section 214 may instead perform, for example, edge enhancement on the first captured image PC1 as the first correction CP1.

When the detection of the second pattern image PA2 from the second captured image PC2 has failed, the correction section 214 performs second correction CP2, which is the correction performed by a greater intensity than the first correction CP1, on the first captured image PC1 to acquire a third captured image PC3. The detection section 213 performs detection of the second pattern image PA2 corresponding to the first pattern image PA1 from the third captured image PC3.

The present embodiment will be described with reference to, but not limited to, the case where the correction section 214 performs the second correction CP2, which is the correction performed by a greater intensity than the first correction CP1, on the first captured image PC1 to acquire the third captured image PC3. The correction section 214 may perform the first correction CP1 on the second captured image PC2 to acquire the third captured image PC3. In this case, the first correction CP1 is repeatedly performed, whereby the processes carried out by the correction section 214 can be simplified.

When the detection of the second pattern image PA2 from the second captured image PC2 has failed, the correction section 214 carries out the processes below. That is, the correction section 214 performs correction CP including the first correction CP1 until the number of times NP by which the correction CP is performed reaches a threshold number of times NPA, or until a period TP required for the correction CP reaches a threshold period TPA to acquire a fourth captured image PC4. The threshold number of times NPA is, for example, three. The threshold period TPA is, for example, 0.3 seconds.

The following description will be made with reference to the case where the correction section 214 performs the correction CP including the first correction CP1 on the first captured image PC1 until the number of times NP by which the correction CP is performed reaches the threshold number of times NPA to acquire the fourth captured image PC4. The larger the number of times NP by which the correction CP is performed, the greater the intensity of the correction CP. In other words, the correction CP is so performed that the intensity of the current correction CP, that is, the correction CP performed by (NP) times is greater than the intensity of the previous correction CP, that is, the correction CP performed by (NP-1) times.

Whenever the correction section 214 performs the correction CP, the detection section 213 performs detection of the second pattern image PA2 on a captured image PC on which the correction CP has been performed.

When the detection of the second pattern image PA2 has been successful, the correction CP performed by the correction section 214 is terminated. When the detection of the second pattern image PA2 has failed, the correction CP is repeatedly performed.

For example, when the detection of the second pattern image PA2 from the third captured image PC3 has failed, the detection section 213 performs detection of the second pattern image PA2 from the fourth captured image PC4.

When the detection of the second pattern image PA2 from the fourth captured image PC4 has failed, the notification section 215 notifies the failure of the detection of the second pattern image PA2. When the detection of the second pattern image PA2 from the fourth captured image PC4 has failed, the notification section 215, for example, causes the display 230 to display a notification image showing the failure of the detection of the second pattern image PA2.

When the detection of the second pattern image PA2 has been successful, the second communication control section 216 transmits the second pattern image PA2 to the projector 100. When the detection of the second pattern image PA2 has failed, the second communication control section 216 transmits notification information representing the failure of the detection of the second pattern image PA2 to the projector 100.

The present embodiment will be described with reference to, but not limited to, the case where the second control section 210 of the smartphone 200 includes the display instruction section 211, the acquisition section 212, the detection section 213, the correction section 214, the notification section 215, the second communication control section 216, and the image storage section 217. For example, the first control section 150 of the projector 100 may include the display instruction section 211, the acquisition section 212, the detection section 213, the correction section 214, the notification section 215, the second communication control section 216, and the image storage section 217. In this case, the smartphone 200 only needs to include the camera 220. Furthermore, in this case, the detection system 1 includes the projector 100 and the camera 220.

In this case, the first processor 150A corresponds to an example of a "processor".

4. Specific Example of First Pattern Image

An example of the first pattern image PA1 will next be described with reference to FIG. 3. FIG. 3 shows an example of the first pattern image PA1.

Figure 3:
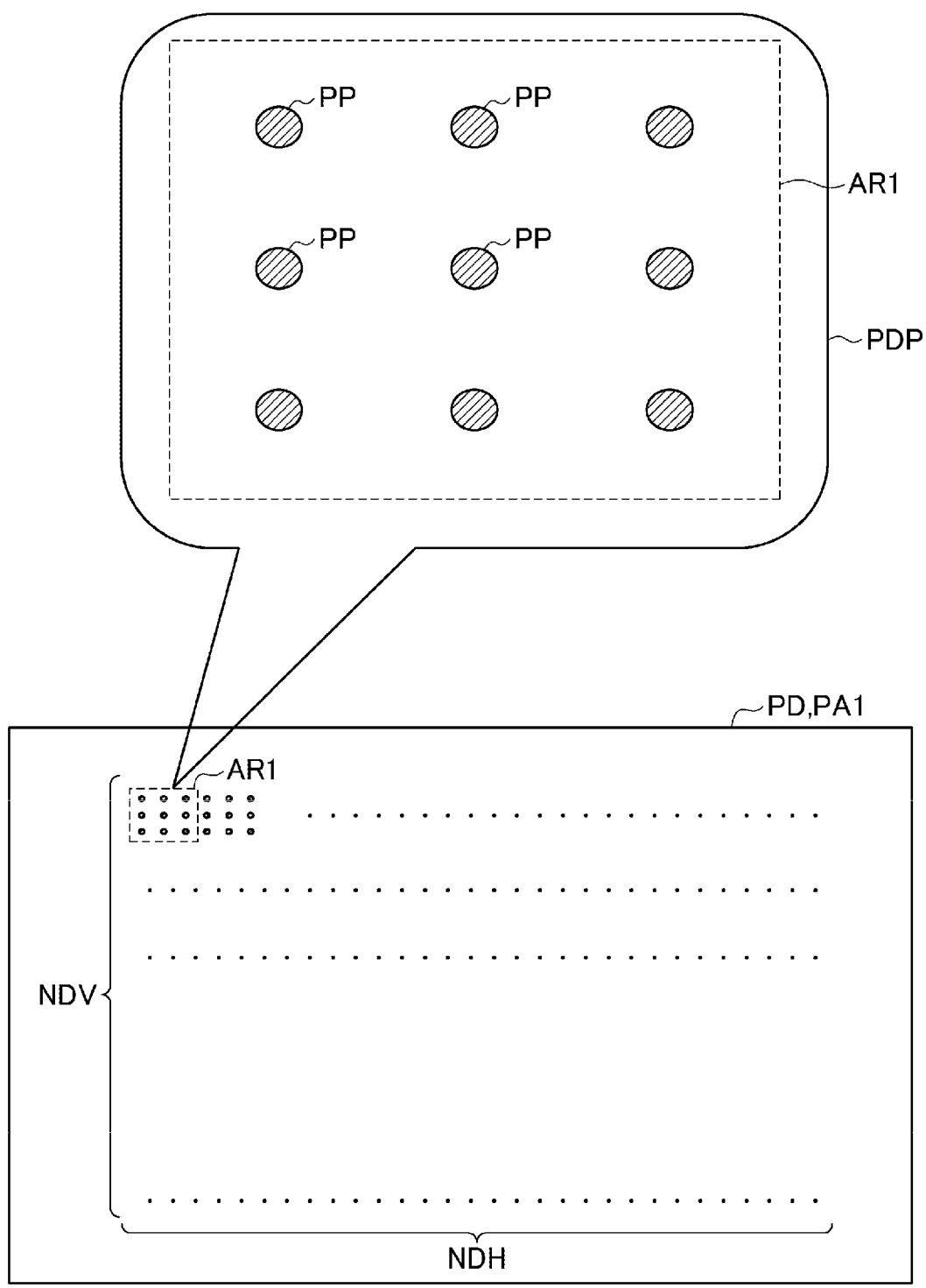
FIG. 3 shows an example of a first pattern image.

The first pattern image PA1 is the dot pattern image PD, as shown in FIG. 3. The lower portion of FIG. 3 shows the entire dot pattern image PD, and the upper portion of FIG. 3 shows an enlarged view PDP of a first region AR1 of the dot pattern image PD.

Nine point images PP are arranged in a grid in the first region AR1. The point images PP each have a circular shape. The point images PP are each formed, for example, of a black circle. The point images PP are arranged at equal intervals in the rightward-leftward direction. The point images PP are arranged at equal intervals also in the upward-downward direction.

The present embodiment will be described with reference to, but not limited to, the case where the point images PP are each formed of a black circle. The point images PP may each be formed of a circle having a chromatic color. The point images PP may each be formed, for example, of a red circle. The point images PP may each be formed, for example, of a green circle. The point images PP may each be formed, for example, of a blue circle.

In the dot pattern image PD, the number NDH of dots arranged in the rightward-leftward direction is, for example, 33. In the dot pattern image PD, the number NDV of dots arranged in the upward-downward direction is, for example, 33.

In this case, the number of point images PP contained in the dot pattern image PD is 1089 (=33×33). When at least 90% of the 1089 point images PP contained in the dot pattern image PD can be detected from the captured image PC, the detection section 213 determines that the detection of the second pattern image PA2 has been successful. That is, when at least 981 point images PP can be detected from the captured image PC, the detection section 213 determines that the detection of the second pattern image PA2 has been successful.

Note that the captured image PC includes the first captured image PC1, the second captured image PC2, the third captured image PC3, and the fourth captured image PC4.

Another example of the first pattern image PA1 will next be described with reference to FIG. 4. FIG. 4 shows another example of the first pattern image PA1.

Figure 4:
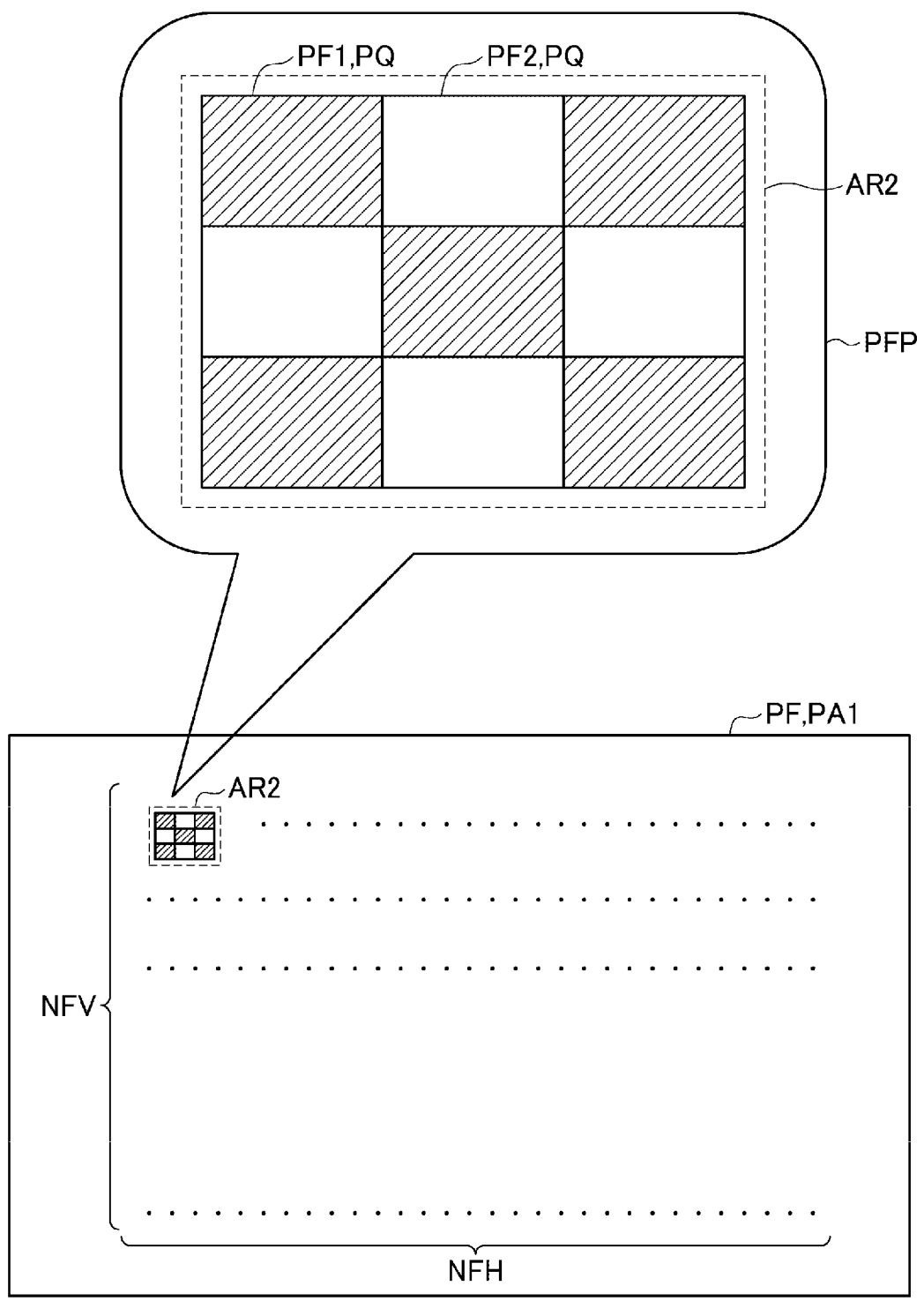
FIG. 4 shows another example of the first pattern image.

The first pattern image PA1 is the checker pattern image PF, as shown in FIG. 4. The lower portion of FIG. 4 shows the entire checker pattern image PF, and the upper portion of FIG. 4 shows an enlarged view PFP of a second region AR2 of the checker pattern image PF.

Nine small images PQ are arranged in a grid in the second region AR2. The nine small images PQ are formed of the first rectangular images PF1 and the second rectangular images PF2. The first rectangular images PF1 and the second rectangular images PF2 are arranged to form what is called a "checkerboard" pattern. The first rectangular images PF1 are each a rectangular image having a first color C1, and the second rectangular images PF2 are each a rectangular image having a second color C2, which differs from the first color C1. The first color C1 is, for example, black, and the second color C2 is, for example, white.

The present embodiment is described with reference to, but not limited to, the case where the first color C1 is black and the second color C2 is white. At least one of the first color C1 and the second color C2 may be a chromatic color. For example, the first color C1 may be red, green, or blue, and the second color C2 may be white.

In the checker pattern image PF, the number NFH of small images PQ, that is, the first rectangular images PF1 and the second rectangular images PF2, arranged in the rightward-leftward direction is, for example, 16. In the checker pattern image PF, the number NFV of small images PQ, that is, the first rectangular images PF1 and the second rectangular images PF2, arranged in the upward-downward direction is, for example, 9.

In this case, the number of small images PQ, that is, the first rectangular images PF1 and the second rectangular images PF2, contained in the checker pattern image PF is 144 (=16×9). When all the small images PQ, that is, the first rectangular images PF1 and second rectangular images PF2, contained in the checker pattern image PF can be detected from the captured image PC, the detection section 213 determines that the detection of the second pattern image PA2 has been successful. That is, when all the small images PQ, that is, all the first rectangular images PF1 and second rectangular images PF2 can be detected from the captured image PC, the detection section 213 determines that the detection of the second pattern image PA2 has been successful.

Note that the captured image PC includes the first captured image PC1, the second captured image PC2, the third captured image PC3, and the fourth captured image PC4.

5. Processes Carried Out by Smartphone

Figure 5:
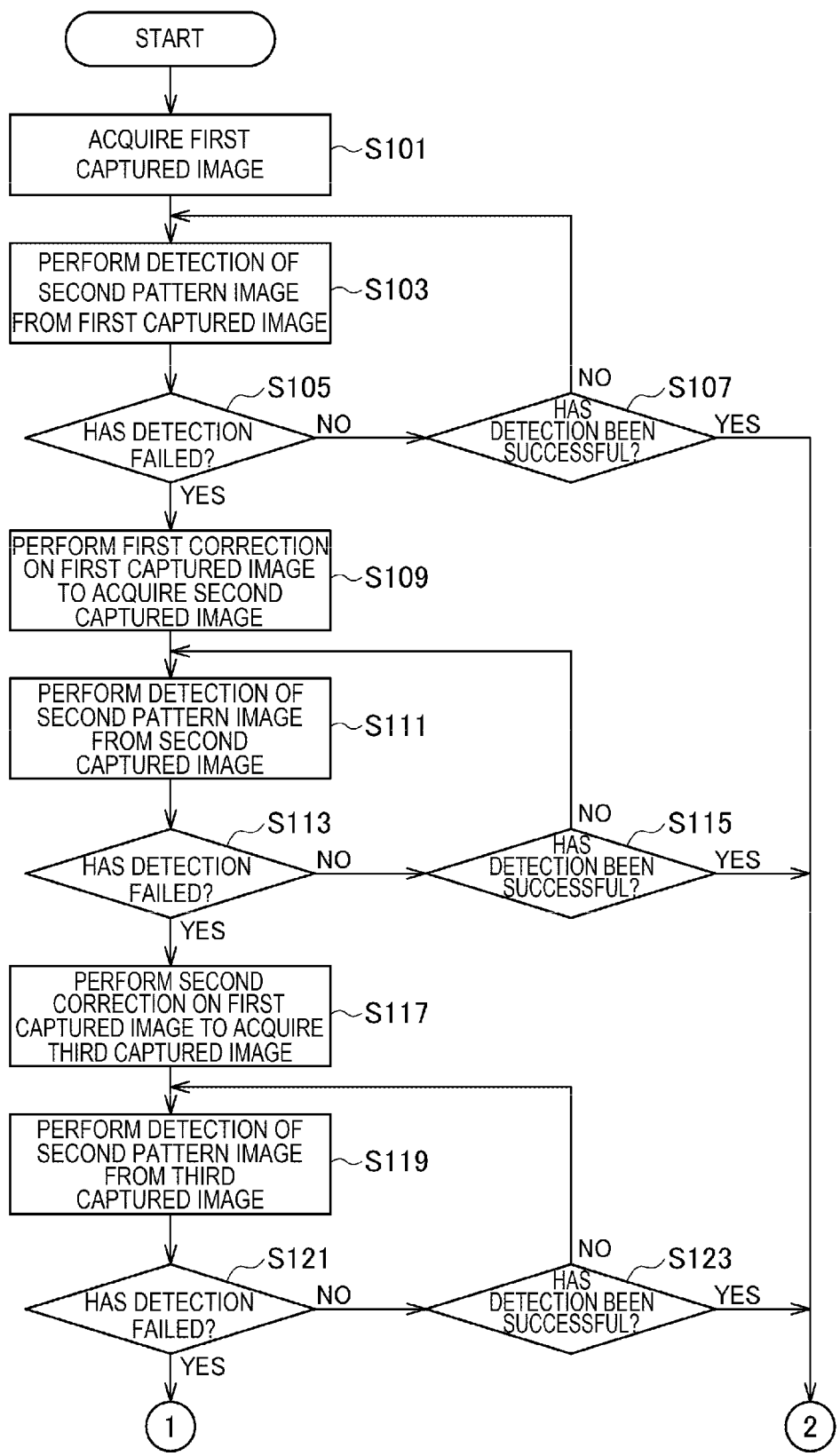
FIG. 5 is a flowchart showing an example of the processes carried out by the smartphone.

An example of the processes carried out by the second control section 210 of the smartphone 200 will next be described with reference to FIGS. 5 and 6. FIGS. 5 and 6 are flowcharts showing an example of the processes carried out by the second control section 210 of the smartphone 200.

In FIGS. 5 and 6, the description will be made with reference to the case where the correction section 214 performs the correction CP on the first captured image PC1 until the number of times NP by which the correction CP including the first correction CP1 is performed reaches the threshold number of times NPA. In FIGS. 5 and 6, the description will be made with reference also to the case where the threshold number of times NPA is three. In FIGS. 5 and 6, the description will be made with reference still also to the case where the projector 100 displays the first pattern image PA1 as the projected image PB on the projection surface SC.

In step S101, the acquisition section 212 acquires the first captured image PC1, which is an image, captured with the camera 220, of the first pattern image PA1, that is, the projected image PB, as shown in FIG. 5.

Thereafter, in step S103, the detection section 213 performs the detection of the second pattern image PA2 corresponding to the first pattern image PA1 from the first captured image PC1.

Thereafter, in step S105, the detection section 213 evaluates whether the detection of the second pattern image PA2 from the first captured image PC1 has failed.

When the detection section 213 determines that the detection of the second pattern image PA2 from the first captured image PC1 has not failed (NO in step S105), the detection section 213 proceeds to the process in step S107.

Thereafter, in step S107, the detection section 213 evaluates whether the detection of the second pattern image PA2 from the first captured image PC1 has been successful to ascertain whether an error has occurred.

When the detection section 213 determines that the detection of the second pattern image PA2 from the first captured image PC1 has not been successful (NO in step S107), the detection section 213 returns to the process in step S103. When the detection section 213 determines that the detection of the second pattern image PA2 from the first captured image PC1 has been successful (YES in step S107), the detection section 213 proceeds to the process in step S135 in FIG. 6.

When there is no need to ascertain whether an error has occurred, step S107 may be omitted. In this case, when the detection section 213 determines that the detection of the second pattern image PA2 from the first captured image PC1 has not failed (NO in step S105), the detection section 213 may proceed to the process in step S135 in FIG. 6.

When the detection section 213 determines that the detection of the second pattern image PA2 from the first captured image PC1 has failed (YES in step S105), the detection section 213 proceeds to the process in step S109.

Thereafter, in step S109, the correction section 214 performs the first correction CP1 on the first captured image PC1 to acquire the second captured image PC2.

Thereafter, in step S111, the detection section 213 performs detection of the second pattern image PA2 from the second captured image PC2.

Thereafter, in step S113, the detection section 213 evaluates whether the detection of the second pattern image PA2 from the second captured image PC2 has failed.

When the detection section 213 determines that the detection of the second pattern image PA2 from the second captured image PC2 has not failed (NO in step S113), the detection section 213 proceeds to the process in step S115.

Thereafter, in step S115, the detection section 213 evaluates whether the detection of the second pattern image PA2 from the second captured image PC2 has been successful to ascertain whether an error has occurred.

When the detection section 213 determines that the detection of the second pattern image PA2 from the second captured image PC2 has not been successful (NO in step S115), the detection section 213 returns to the process in step S111. When the detection section 213 determines that the detection of the second pattern image PA2 from the second captured image PC2 has been successful (YES in step S115), the detection section 213 proceeds to the process in step S135 in FIG. 6.

When there is no need to ascertain whether an error has occurred, step S115 may be omitted. In this case, when the detection section 213 determines that the detection of the second pattern image PA2 from the second captured image PC2 has not failed (NO in step S113), the detection section 213 may proceed to the process in step S135 in FIG. 6.

When the detection section 213 determines that the detection of the second pattern image PA2 from the second captured image PC2 has failed (YES in step S113), the detection section 213 proceeds to the process in step S117.

Thereafter, in step S117, the correction section 214 performs the second correction CP2 on the first captured image PC1 to acquire the third captured image PC3. The second correction CP2 performs the correction by a greater intensity than the first correction CP1.

Thereafter, inn step S119, the detection section 213 performs detection of the second pattern image PA2 from the third captured image PC3.

Thereafter, in step S121, the detection section 213 evaluates whether the detection of the second pattern image PA2 from the third captured image PC3 has failed.

When the detection section 213 determines that the detection of the second pattern image PA2 from the third captured image PC3 has not failed (NO in step S121), the detection section 213 proceeds to the process in step S123.

Thereafter, in step S123, the detection section 213 evaluates whether the detection of the second pattern image PA2 from the third captured image PC3 has been successful to ascertain whether an error has occurred.

When the detection section 213 determines that the detection of the second pattern image PA2 from the third captured image PC3 has not been successful (NO in step S123), the detection section 213 returns to the process in step S119. When the detection section 213 determines that the detection of the second pattern image PA2 from the third captured image PC3 has been successful (YES in step S123), the detection section 213 proceeds to the process in step S135 in FIG. 6.

When there is no need to ascertain whether an error has occurred, step S123 may be omitted. In this case, when the detection section 213 determines that the detection of the second pattern image PA2 from the third captured image PC3 has not failed (NO in step S121), the detection section 213 may proceed to the process in step S135 in FIG. 6.

When the detection section 213 determines that the detection of the second pattern image PA2 from the third captured image PC3 has failed (YES in step S121), the detection section 213 proceeds to the process in step S125 in FIG. 6.

Thereafter, in step S125, the correction section 214 performs third correction CP3 on the first captured image PC1 to acquire the fourth captured image PC4, as shown in FIG. 6. The third correction CP3 performs the correction by a greater intensity than the second correction CP2.

Thereafter, in step S127, the detection section 213 performs detection of the second pattern image PA2 from the fourth captured image PC4.

Thereafter, in step S129, the detection section 213 evaluates whether the detection of the second pattern image PA2 from the fourth captured image PC4 has failed.

When the detection section 213 determines that the detection of the second pattern image PA2 from the fourth captured image PC4 has failed (YES in step S129), the detection section 213 proceeds to the process in step S133.

Thereafter, in step S133, the notification section 215 notifies the failure of the detection of the second pattern image PA2. The processes are then terminated.

When the detection section 213 determines that the detection of the second pattern image PA2 from the fourth captured image PC4 has not failed (NO in step S129), the detection section 213 proceeds to the process in step S131.

Thereafter, in step S131, the detection section 213 evaluates whether the detection of the second pattern image PA2 from the fourth captured image PC4 has been successful to ascertain whether an error has occurred.

When the detection section 213 determines that the detection of the second pattern image PA2 from the fourth captured image PC4 has not been successful (NO in step S131), the detection section 213 returns to the process in step S127. When the detection section 213 determines that the detection of the second pattern image PA2 from the fourth captured image PC4 has been successful (YES in step S131), the detection section 213 proceeds to the process in step S135.

Thereafter, in step S135, the second communication control section 216 transmit the second pattern image PA2 to the projector 100. The processes are then terminated.

When there is no need to ascertain whether an error has occurred, step S131 may be omitted. In this case, when the detection section 213 determines that the detection of the second pattern image PA2 from the fourth captured image PC4 has not failed (NO in step S129), the detection section 213 may proceed to the process in step S135 in FIG. 6.

As described above, the correction section 214 repeatedly performs the correction on the first captured image PC1. Whenever the correction section 214 performs the correction, the detection section 213 performs the detection of the second pattern image PA2 on each of the second captured image PC2, the third captured image PC3, and the fourth captured image PC4 on which the correction section 214 has performed the correction. The possibility of successful detection of the second pattern image PA2 can therefore be increased.

6. Present Embodiment and Effects and Advantages

As described with reference to FIGS. 1 to 6, the method for detecting the second pattern image PA2 according to the present embodiment includes causing the projector 100 to display the first pattern image PA1, acquiring the first captured image PC1, which is an image, captured with the camera 220, of the first pattern image PA1, performing detection of the second pattern image PA2 corresponding to the first pattern image am from the first captured image PC1, when the detection of the second pattern image PA2 from the first captured image PC1 has failed, performing the first correction CP1, which increases the possibility of successful detection of the second pattern image PA2, on the first captured image PC1 to acquire the second captured image PC2, and performing detection of the second pattern image PA2 from the second captured image PC2.

According to the configuration described above, when the detection of the second pattern image PA2 from the first captured image PC1 captured with the camera 220 has failed, the processes below are carried out. That is, the first correction CP1, which increases the possibility of successful detection of the second pattern image PA2, is performed on the first captured image PC1 to acquire the second captured image PC2. Detection of the second pattern image PA2 from the second captured image PC2 is then performed.

The first correction CP1, which increases the possibility of successful detection of the second pattern image PA2, is therefore performed on the first captured image PC1 to acquire the second captured image PC2. The possibility of detection of the second pattern image PA2 from the second captured image PC2 is hence higher than the possibility of detection of the second pattern image PA2 from the first captured image PC1. The possibility of detection of the second pattern image PA2 can therefore be increased.

In the method for detecting the second pattern image PA2 according to the present embodiment, the first pattern image PA1 is the dot pattern image PD containing the plurality of dot images PP.

According to the configuration described above, the first pattern image PA1 is the dot pattern image PD containing the plurality of dot images PP.

The projector 100 can therefore display an appropriate image as the first pattern image PA1.

In the method for detecting the second pattern image PA2 according to the present embodiment, the first correction CP1 includes reduction of the noise contained in the first captured image PC1.

According to the configuration described above, the first correction CP1 includes reduction of noise contained in the first captured image PC1.

Performing the first correction CP1 on the first captured image PC1 therefore allows acquisition of the second captured image PC2 with the noise contained in the first captured image PC1 reduced. The possibility of detection of the second pattern image PA2 from the second captured image PC2 can hence be higher than the possibility of detection of the second pattern image PA2 from the first captured image PC1. The possibility of detection of the second pattern image PA2 can therefore be increased.

In the method for detecting the second pattern image PA2 according to the present embodiment, the first pattern image PA1 is the checker pattern image PF containing the first rectangular images PF1 having the first color C1 and the second rectangular images PF2 having the second color C2 different from the first color C1.

According to the configuration described above, the first pattern image PA1 is the checker pattern image PF containing the first rectangular images PF1 having the first color C1 and the second rectangular images PF2 having the second color C2 different from the first color C1.

The projector 100 can therefore display an appropriate image as the first pattern image PA1.

In the method for detecting the second pattern image PA2 according to the present embodiment, the first correction CP1 includes adjustment of the contrast of the first captured image PC1.

According to the configuration described above, the first correction CP1 includes adjustment of the contrast of the first captured image PC1.

Performing the first correction CP1 on the first captured image PC1 therefore allows acquisition of the second captured image PC2 that is the first captured image PC1 with the contrast thereof increased. The possibility of detection of the second pattern image PA2 from the second captured image PC2 can hence be higher than the possibility of detection of the second pattern image PA2 from the first captured image PC1. The possibility of detection of the second pattern image PA2 can therefore be increased.

The method for detecting the second pattern image PA2 according to the present embodiment includes, when the detection of the second pattern image PA2 from the second captured image PC2 fails, performing the second correction CP2, which the correction by a greater intensity than the first correction CP1, on the first captured image PC1 to acquire the third captured image PC3, and performing detection of the second pattern image PA2 from the third captured image PC3.

According to the configuration described above, when the detection of the second pattern image PA2 from the second captured image PC2 fails, the second correction CP2, which is the correction performed by a greater intensity than the first correction CP1, is performed on the first captured image PC1 to acquire the third captured image PC3. Detection of the second pattern image PA2 from the third captured image PC3 is then performed.

The second correction CP2, which is the correction performed by a greater intensity than the first correction CP1, is therefore performed on the first captured image PC1 to acquire the third captured image PC3. The possibility of detection of the second pattern image PA2 from the third captured image PC3 can hence be higher than the possibility of detection of the second pattern image PA2 from the second captured image PC2. The possibility of detection of the second pattern image PA2 can therefore be increased.

The method for detecting the second pattern image PA2 according to the present embodiment includes, when the detection of the second pattern image PA2 from the second captured image PC2 fails, performing the first correction CP1 on the second captured image PC2 to acquire the third captured image PC3, and performing detection of the second pattern image PA2 from the third captured image PC3.

According to the configuration described above, when the detection of the second pattern image PA2 from the second captured image PC2 fails, the first correction CP1 is performed on the second captured image PC2 to acquire the third captured image PC3. Detection of the second pattern image PA2 from the third captured image PC3 is then performed.

The first correction CP1 is thus performed on the second captured image PC2 to acquire the third captured image PC3. The possibility of detection of the second pattern image PA2 from the third captured image PC3 can hence be higher than the possibility of detection of the second pattern image PA2 from the second captured image PC2. The possibility of detection of the second pattern image PA2 can therefore be increased.

The method for detecting the second pattern image PA2 according to the present embodiment further includes, when the detection of the second pattern image PA2 from the second captured image PC2 fails, performing the correction CP until the number of times NP by which the correction CP including the first correction CP1 is performed reaches the threshold number of times NPA or until the period TP required for the correction CP reaches the threshold period TPA to acquire the fourth captured image PC4, and when the detection of the second pattern image PA2 from the fourth captured image PC4 fails, notifying the failure of the detection of the second pattern image PA2.

According to the configuration described above, when the detection of the second pattern image PA2 from the second captured image PC2 has failed, the processes below are carried out. That is, the correction CP including the first correction CP1 is performed until the number of times NP by which the correction CP is performed reaches the threshold number of times NPA, or until the period TP required for the correction CP reaches the threshold period TPA to acquire the fourth captured image PC4. Detection of the second pattern image PA2 from the fourth captured image PC4 is then performed. When the detection of the second pattern image PA2 from the fourth captured image PC4 has failed, the failure of the detection of the second pattern image PA2 is notified.

The correction CP is therefore performed until the number of times NP by which the correction CP is performed reaches the threshold number of times NPA, or until the period TP required for the correction CP reaches the threshold period TPA to acquire the fourth captured image PC4. The possibility of the detection of the second pattern image PA2 from the fourth captured image PC4 can hence be higher than the possibility of the detection of the second pattern image PA2 from the second captured image PC2. The possibility of the detection of the second pattern image PA2 can therefore be increased. When the detection of the second pattern image PA2 from the fourth captured image PC4 has failed, the failure of the detection of the second pattern image PA2 is notified, whereby the user can ascertain the failure of the detection of the second pattern image PA2.

The smartphone 200 according to the present embodiment causes the projector 100 to display the first pattern image PA1, acquires the first captured image PC1, which is an image, captured with the camera 220, of the first pattern image PA1, performs detection of the second pattern image PA2 corresponding to the first pattern image PA1 from the first captured image PC1, when the detection of the second pattern image PA2 from the first captured image PC1 fails, performs the first correction CP1, which increases the possibility of successful detection of the second pattern image PA2, on the first captured image PC1 to acquire the second captured image PC2, and performs detection of the second pattern image PA2 from the second captured image PC2.

According to the configuration described above, the smartphone 200 according to the present embodiment provides the same effects as those provided by the method for detecting the second pattern image PA2 according to the present embodiment.

The detection system 1 according to the present embodiment includes the projector 100, the camera, and the smartphone 200, and the smartphone 200 causes the projector 100 to display the first pattern image PA1, acquires the first captured image PC1, which is an image, captured with the camera 220, of the first pattern image PA1, performs detection of the second pattern image PA2 corresponding to the first pattern image PA1 from the first captured image PC1, when the detection of the second pattern image PA2 from the first captured image PC1 fails, performs the first correction CP1, which increases the possibility of successful detection of the second pattern image PA2, on the first captured image PC1 to acquire the second captured image PC2, and performs detection of the second pattern image PA2 from the second captured image PC2.

According to the configuration described above, the detection system 1 according to the present embodiment provides the same effects as those provided by the method for detecting the second pattern image PA2 according to the present embodiment.

The second control program PG2 according to the present embodiment causes the second processor 210A to cause the projector 100 to display the first pattern image PA1, acquire the first captured image PC1, which is an image, captured with the camera 220, of the first pattern image PA1, perform detection of the second pattern image PA2 corresponding to the first pattern image PA1 from the first captured image PC1, when the detection of the second pattern image PA2 from the first captured image PC1 fails, perform the first correction CP1, which increases the possibility of successful detection of the second pattern image PA2, on the first captured image PC1 to acquire the second captured image PC2, and perform detection of the second pattern image PA2 from the second captured image PC2.

According to the configuration described above, the second control program PG2 according to the present embodiment provides the same effects as those provided by the method for detecting the second pattern image PA2 according to the present embodiment.

7. Other Embodiments

The present embodiment described above is a preferable embodiment. The present disclosure is, however, not limited to the embodiment described above, and a variety of variations are conceivable to the extent that the variations do not depart from the substance of the present disclosure.

The present embodiment has been described with reference to, but not limited to, the case where the "display apparatus" is the projectors 100. The "display apparatus" may instead, for example, be an LCD or, for example, an organic EL (electro-luminescence) display.

The present embodiment has been described with reference to, but not limited to, the case where the "information processing apparatus" is the smartphone 200. The "information processing apparatus" may instead, for example, be a PDA (personal digital assistant), a tablet terminal, or a personal computer.

The present embodiment has been described with reference to, but not limited to, the case where the "information processing apparatus" includes the camera 220. The camera may be a component separate from the "information processing apparatus". In this case, the detection system 1 includes the "display apparatus" such as the projector 100, the "information processing apparatus" such as the smartphone 200, and the camera.

The present embodiment has been described with reference to, but not limited to, the case where the projectors 100 performs what is called "correspondence point detection". For example, the smartphone 200 may instead perform what is called "correspondence point detection".

The functional portions shown in FIG. 2 each represent a functional configuration and is not necessarily implemented in a specific form. That is, hardware corresponding to each of the functional portions is not necessarily implemented, and a single processor that executes a program can, of course, achieve the functions of the plurality of functional portions. Furthermore, part of the functions achieved by software in the embodiment described above may be achieved by hardware, or part of the functions achieved by hardware in the embodiment described above may be achieved by software. In addition, the specific detailed configuration of each of the other portions of the smartphone 200 can be changed in any manner to the extent that the change does not depart from the intent of the present disclosure.

The process units shown in FIGS. 5 and 6 are process units into which the process carried out by the second control section 210 is divided in accordance with the primary processing content for easy understanding of the process. The present disclosure is not limited by how to produce the divided process units or the names of the process units in the flowcharts shown in FIGS. 5 and 6. The processes units can each be further divided into a larger number of process units in accordance with the content of the process, or each of the process units can be divided to further include a large number of processes. Furthermore, the orders in accordance with which the processes are carried out in the flowcharts described above are not limited to those shown in FIGS. 5 and 6.

The method for detecting the second pattern image PA2 can be achieved by causing the second processor 210A provided in the smartphone 200 to execute the second control program PG2 corresponding to the method for detecting the second pattern image PA2. The second control program PG2 can instead be recorded on a computer readable recording medium. The recording medium can be a magnetic or optical recording medium or a semiconductor memory device.

Specific examples of the recording medium may include a flexible disk, an HDD, a CD-ROM (compact disk read only memory), a DVD, a Blu-ray (registered trademark) Disc, a magneto-optical disk, a flash memory, a portable recording medium, such as a card-shaped recording medium, and an immobile recording medium. The recording medium may instead be a RAM, a ROM, an HDD, or any other nonvolatile storage apparatus that is an internal storage apparatus provided in an image processing apparatus.

Instead, the second control program PG2 corresponding to the method for detecting the second pattern image PA2 can be stored in a server apparatus or any other component, and the second control program PG2 can be downloaded from the server apparatus to the smartphone 200 to achieve the method for detecting the second pattern image PA2.

The present embodiment will be described with reference, but not limited to, to the case where the second control section 210 of the smartphone 200 includes the display instruction section 211, the acquisition section 212, the detection section 213, the correction section 214, the notification section 215, the second communication control section 216, and the image storage section 217. For example, the first control section 150 of the projector 100 may include the display instruction section 211, the acquisition section 212, the detection section 213, the correction section 214, the notification section 215, the second communication control section 216, and the image storage section 217. In this case, the smartphone 200 only needs to include the camera 220. Furthermore, in this case, the detection system 1 includes the projector 100 and the camera 220.

In this case, the first processor 150A corresponds to an example of the "computer". The first control program PG1 corresponds to an example of the "program".

In this case, the method for detecting the second pattern image PA2 can be achieved by causing the first processor 150A provided in the projector 100 to execute the first control program PG1 corresponding to the method for detecting the second pattern image PA2. The first control program PG1 can also be recorded on a computer readable recording medium. The recording medium can be a magnetic or optical recording medium or a semiconductor memory device.

Specific examples of the recording medium may include a flexible disk, an HDD, a CD-ROM, a DVD, a Blu-ray (registered trademark) Disc, a magneto-optical disk, a flash memory, a portable, such as a card-shaped recording medium, and immobile recording medium. The recording medium may instead be a RAM, a ROM, an HDD, or any other nonvolatile storage apparatus that is an internal storage apparatus provided in an image processing apparatus.

Instead, the first control program PG1 corresponding to the method for detecting the second pattern image PA2 can be stored in a server apparatus or any other component, and the first control program PG1 can be downloaded from the server apparatus to the projector 100 to achieve the method for detecting the second pattern image PA2.

8. Summary of Present Disclosure

The present disclosure will be summarized below as additional remarks.
Additional Remark 1
A method for detecting a pattern image including causing a display apparatus to display a first pattern image, acquiring a first captured image that is an image, captured with a camera, of the first pattern image, performing detection of a second pattern image corresponding to the first pattern image from the first captured image, when the detection of the second pattern image from the first captured image fails, performing first correction that increases possibility of successful detection of the second pattern image on the first captured image to acquire a second captured image, and performing detection of the second pattern image from the second captured image.

The first correction, which increases the possibility of successful detection of the second pattern image, is thus performed on the first captured image to acquire the second captured image. The possibility of the detection of the second pattern image from the second captured image is hence higher than the possibility of the detection of the second pattern image from the first captured image. The possibility of the detection of the second pattern image can therefore be increased.
Additional Remark 2
The method for detecting a pattern image described in the additional remark 1, in which the first pattern image is a dot pattern image containing a plurality of point images.
The display apparatus can therefore display an appropriate image as the first pattern image.
Additional Remark 3
The method for detecting a pattern image described in the additional remark 2, in which the first correction includes reduction of noise contained in the first captured image.
Performing the first correction on the first captured image therefore allows acquisition of the second captured image with the noise contained in the first captured image reduced. The possibility of the detection of the second pattern image from the second captured image can hence be higher than the possibility of the detection of the second pattern image from the first captured image. The possibility of the detection of the second pattern image can therefore be increased.

Additional Remark 4

The method for detecting a pattern image described in the additional remark 1, in which the first pattern image is a checker pattern image containing rectangular images having a first color and rectangular images having a second color different from the first color.

The display apparatus can therefore display an appropriate image as the first pattern image.

Additional Remark 5

The method for detecting a pattern image described in the additional remark 4, in which the first correction includes adjustment of contrast of the first captured image.

Performing the first correction on the first captured image therefore allows acquisition of the second captured image that is the first captured image with the contrast thereof increased. The possibility of the detection of the second pattern image from the second captured image can hence be higher than the possibility of the detection of the second pattern image from the first captured image. The possibility of the detection of the second pattern image can therefore be increased.

Additional Remark 6

The method for detecting a pattern image described in any one of the additional remarks 1 to 5, further including, when the detection of the second pattern image from the second captured image fails, performing second correction that performs the correction by a greater intensity than the first correction on the first captured image to acquire a third captured image, and performing detection of the second pattern image from the third captured image.

The second correction, which is the correction performed by a greater intensity than the first correction, is thus performed on the first captured image to acquire the third captured image. The possibility of the detection of the second pattern image from the third captured image can hence be higher than the possibility of the detection of the second pattern image from the second captured image. The possibility of the detection of the second pattern image can therefore be increased.

Additional Remark 7

The method for detecting a pattern image described in any one of the additional remarks 1 to 5, further including, when the detection of the second pattern image from the second captured image fails, performing the first correction on the second captured image to acquire a third captured image, and performing detection of the second pattern image from the third captured image.

The first correction is thus performed on the second captured image to acquire the third captured image. The possibility of the detection of the second pattern image from the third captured image can hence be higher than the possibility of the detection of the second pattern image from the second captured image. The possibility of the detection of the second pattern image can therefore be increased.

Additional Remark 8

The method for detecting a pattern image described in any one of the additional remarks 1 to 7, further including, when the detection of the second pattern image from the second captured image fails, performing correction including the first correction until the number of times by which the correction is performed reaches a threshold number of times or until a period required for the correction reaches a threshold period to acquire a fourth captured image, performing detection of the second pattern image from the fourth captured image, and when the detection of the second pattern image from the fourth captured image fails, notifying the failure of the detection of the second pattern image.

The correction is thus performed to acquire the fourth captured image until the number of times by which the correction is performed reaches the threshold number of times, or until the period required for the correction reaches the threshold period. The possibility of the detection of the second pattern image from the fourth captured image can hence be higher than the possibility of the detection of the second pattern image from the second captured image. The possibility of the detection of the second pattern image can therefore be increased. When the detection of the second pattern image from the fourth captured image has failed, the failure of the detection of the second pattern image is notified, whereby a user can ascertain the failure of the detection of the second pattern image.

Additional Remark 9

An information processing apparatus causes a display apparatus to display a first pattern image, acquires a first captured image that is an image, captured with a camera, of the first pattern image, performs detection of a second pattern image corresponding to the first pattern image from the first captured image, when the detection of the second pattern image from the first captured image fails, performs first correction that increases possibility of successful detection of the second pattern image on the first captured image to acquire a second captured image, and performs detection of the second pattern image from the second captured image.

The information processing apparatus described in the additional remark 9 thus provides the same effects as those provided by the method for detecting a pattern image described in the additional remark 1.

Additional Remark 10

A detection system includes a display apparatus, a camera, and an information processing apparatus, and the information processing apparatus causes the display apparatus to display a first pattern image, acquires a first captured image that is an image, captured with the camera, of the first pattern image, performs detection of a second pattern image corresponding to the first pattern image from the first captured image, when the detection of the second pattern image from the first captured image fails, performs first correction that increases possibility of successful detection of the second pattern image on the first captured image to acquire a second captured image, and performs detection of the second pattern image from the second captured image.

The detection system described in the additional remark 10 thus provides the same effects as those provided by the method for detecting a pattern image described in the additional remark 1.

Additional Remark 11

A non-transitory computer-readable storage medium storing a program that causes a computer to cause a display apparatus to display a first pattern image, acquire a first captured image that is an image, captured with a camera, of the first pattern image, perform detection of a second pattern image corresponding to the first pattern image from the first captured image, when the detection of the second pattern image from the first captured image fails, perform first correction that increases possibility of successful detection of the second pattern image on the first captured image to acquire a second captured image, and perform detection of the second pattern image from the second captured image.

The non-transitory computer-readable storage medium storing a program described in the additional remark 11 thus provides the same effects as those provided by the method for detecting a pattern image descried in the additional remark 1.

What is claimed is:

1. A detection system comprising:
a display apparatus which displays a first pattern image;
a camera; and
an information processing apparatus including at least one processor programmed to
acquire a first captured image by capturing the first pattern image with a camera,
performs detection of a second pattern image corresponding to the first pattern image from the first captured image,
when the detection of the second pattern image from the first captured image fails,
acquiring a second captured image by performs first correction that increases possibility of successful detection of the second pattern image on the first captured image, and
performs detection of the second pattern image from the second captured image.

2. An information processing apparatus comprising:
at least one processor programmed to execute
causing a display apparatus to display a first pattern image;
acquiring a first captured image of the first pattern image with a camera;
performing detection of a second pattern image corresponding to the first pattern image from the first captured image;
when the detection of the second pattern image from the first captured image fails,
acquiring a second captured image by performing first correction that increases possibility of successful detection of the second pattern image on the first captured image; and
performing detection of the second pattern image from the second captured image.

3. A method for detecting a pattern image, the method comprising:
displaying a first pattern image by a display apparatus;
acquiring a first captured image by capturing the first pattern image with a camera;
performing detection of a second pattern image corresponding to the first pattern image from the first captured image;
when the detection of the second pattern image from the first captured image fails,
acquiring a second captured image by performing first correction that increases possibility of successful detection of the second pattern image on the first captured image; and
performing detection of the second pattern image from the second captured image.

4. The method for detecting a pattern image according to claim 3, wherein the first pattern image is a dot pattern image containing a plurality of point images.

5. The method for detecting a pattern image according to claim 4, wherein the first correction includes reduction of noise contained in the first captured image.

6. The method for detecting a pattern image according to claim 3, wherein the first pattern image is a checker pattern image containing rectangular images having a first color and rectangular images having a second color different from the first color.

7. The method for detecting a pattern image according to claim 6, wherein the first correction includes adjustment of contrast of the first captured image.

8. The method for detecting a pattern image according to claim 3, further comprising:
when the detection of the second pattern image from the second captured image fails,
acquiring a third captured image by performing second correction that performs correction by a greater intensity than the first correction on the first captured image; and
performing detection of the second pattern image from the third captured image.

9. The method for detecting a pattern image according to claim 3, further comprising:
when the detection of the second pattern image from the second captured image fails,
acquiring a third captured image by performing the first correction on the second captured image; and
performing detection of the second pattern image from the third captured image.

10. The method for detecting a pattern image according to claim 3, further comprising:
when the detection of the second pattern image from the second captured image fails,
acquiring a fourth captured image by performing correction including the first correction until the number of times by which the correction is performed reaches a threshold number of times or until a time period required for the correction reaches a threshold period;
performing detection of the second pattern image from the fourth captured image, and;
when the detection of the second pattern image from the fourth captured image fails, notifying the failure of the detection of the second pattern image.

* * * * *